United States Patent [19]

Zickwolf, Jr.

[11] 4,280,059
[45] Jul. 21, 1981

[54] DETECTING POWER LOSS IN FREE TURBINES

[75] Inventor: Herbert C. Zickwolf, Jr., Bozrah, Conn.

[73] Assignee: United Technologies Corporation, Hartford, Conn.

[21] Appl. No.: 107,294

[22] Filed: Dec. 26, 1979

[51] Int. Cl.³ .............................. F02C 1/00; H02P 9/04
[52] U.S. Cl. ........................................ 290/40 B; 290/52
[58] Field of Search ................ 290/40 R, 52, 40 A, 290/40 B, 40 C; 60/906; 318/458; 307/152

[56] References Cited

U.S. PATENT DOCUMENTS

| 2,804,551 | 8/1957 | McFarland | 290/40 R |
| 3,070,705 | 12/1962 | Forss et al. | 290/40 R |
| 3,198,954 | 8/1965 | Eggenberger et al. | 290/40 R |
| 3,529,241 | 9/1970 | Bright | 307/152 |
| 3,795,816 | 3/1974 | Frei | 290/52 |
| 4,071,870 | 1/1978 | Bloch | 290/40 R |
| 4,114,084 | 9/1978 | Glaudel et al. | 290/40 R |

Primary Examiner—B. Dobeck
Assistant Examiner—Shelley Wade
Attorney, Agent, or Firm—Charles A. Warren

[57] ABSTRACT

A method of detecting rapid loss of electrical load in an industrial free turbine prior to significant turbine overspeed and reducing fuel to a predetermined lower power level thereby to avoid the need for a complete shutdown of the engine is disclosed. The method is unaffected by small power losses and by normal transients.

5 Claims, 3 Drawing Figures

DETECTING POWER LOSS IN FREE TURBINES

BACKGROUND OF THE INVENTION

In industrial turbines a drastic loss of load is normally sensed by free turbine overspeed and if the overspeed is too severe a fuel cutoff will occur resulting in engine shutdown (trip-out). Complete shutdown from high power may result in engine overstress and/or damage because of the effects of differential expansion, frequently necessitating a long shutdown time in order that the engine may be cooled sufficiently for restarting. This is particularly true when the stator, in contracting, seizes the rotor necessitating a long cooling period before the rotor is again free to turn. Damage would result from such seizing of the rotor.

SUMMARY OF THE INVENTION

A feature of this invention is a method of detecting a rapid loss of applied load to the power turbine permitting a reduction in the fuel supply to a lower power level antecedent to a subsequent overspeed thereby reducing the magnitude of the overspeed and/or avoiding the complete shutdown of the engine.

Another feature is the ability to set a threshold for both the arming level and rate sensitivity to prevent unnecessary nuisance detections during normal operation and/or because of spurious signal noise. Large power load losses from high power will be detected and corrective fuel flow action initiated to limit the turbine overspeed.

According to the present invention a significant reduction in power load on the engine will cause a reduction of fuel flow to a lower threshold, for example 50% power, thereby avoiding complete shutdown by a turbine overspeed. This control is an adjunct to the present controls and has a built-in time delay constant such that small power losses and a normal power transient or momentary power losses will not affect this device and the normal controls will prevail. The device is so structured that should a fuel reduction to the required threshold setting be inadequate and an engine overspeed did occur, the normal overspeed control will be operative to shut the engine down completely.

The foregoing and other objects, features and advantages of the present invention will become more apparent in the light of the following detailed description of preferred embodiments thereof.

DETAILED DESCRIPTION OF THE PREFERRED EMBODIMENT

Figure 1:
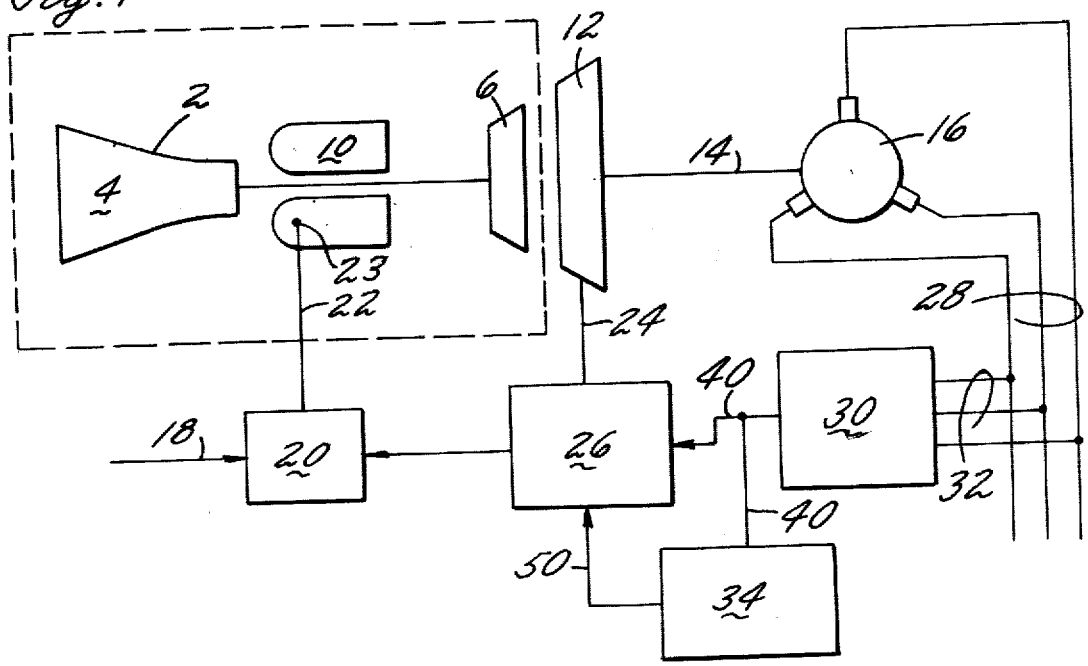
FIG. 1 is a diagrammatic view of the control.

The engine is represented in the drawing by a gas generator 2 including a compressor 4 and turbine 6 on a shaft 8 and a burner 10 between the compressor and turbine. This gas generator supplies hot gas under pressure to drive a free or power turbine 12 connected by a shaft 14 to a load, for example a generator 16.

Fuel is supplied to the burner from a supply line 18 through a fuel valve 20 and conduit 22 to nozzles 23 in the burner. During normal operation a fuel flow control 26 modulates the valve 20 to provide the desired engine operation. A free turbine speed sensor 24 supplies a speed indication to the control 26 so that the valve 20 is actuated in part as a function of free turbine speed.

The generator delivers electrical power through output lines 28 and the load is sensed by a power sensor 30 through leads 32. This sensor 30 delivers a power sense signal 40 to the control 26 for modulation of the valve 20 as a function of load.

Figure 2:
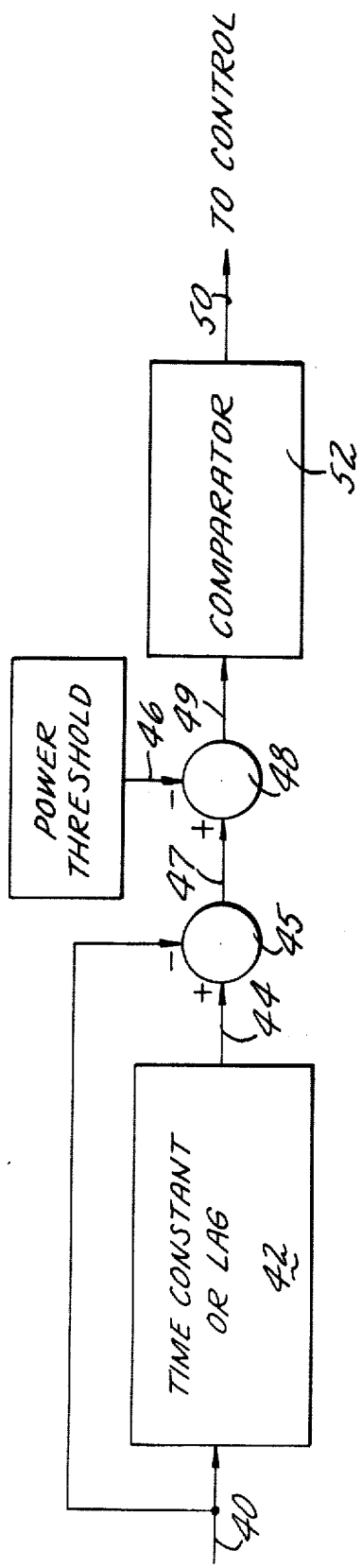
FIG. 2 is a diagram of the load loss detector.

In the event of a sudden substantial loss of power, the load loss detector 34, which is detailed in FIG. 2, comes into operation. The power loss detector circuit operates by modifying power sense signal 40 by a time constant device or lag circuit 42. The lag circuit output 44 is compared with the sensed power signal 40 in comparator device 45 to obtain a signal 47 which is indicative of the rate of power loss. A power level threshold signal 46 is subtracted from signal 47, by device 48 to give a substrate signal 49 the polarity of which is indicative of the rate of power loss relative to the operating power level. A large rapid power loss causes signal 49 to be a positive value. In the event of normal decelerations or small power losses, signal 49 remains negative. A rate threshold circuit comparator 52 discriminates between large, rapid power losses (positive signal) and small power losses (negative signal). In the event of a positive signal 49 (rapid power loss), detector 48 outputs a pulse signal 50 to the control 26, commanding a reduction in fuel flow.

Figure 3:
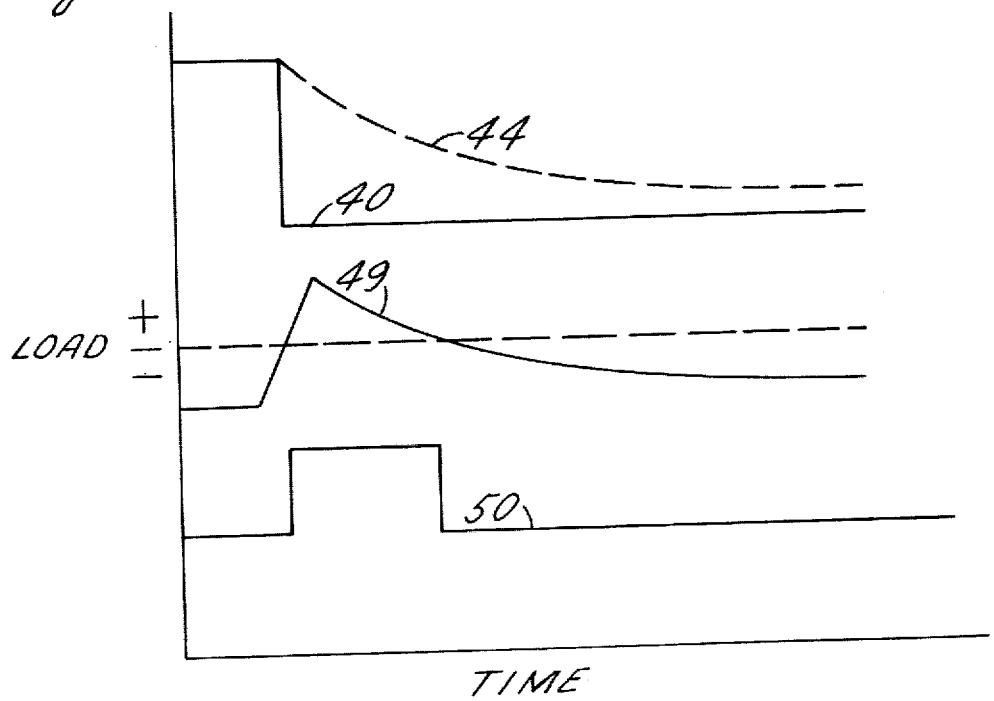
FIG. 3 is a plot of the pattern when the control is operative.

FIG. 3 shows the typical chain of events that occurs during a large loss of power. The power sensor signal 40 shows an immediate loss in power. The time constant signal 44 is in the nature of an exponential decay. The output of comparator circuit 45 is biased by power threshold circuit 46 to make signal 49. Signal 49 is checked for polarity in comparator circuit 52. When a large rapid power loss occurs, as noted by a positive signal in line 49, circuit 48 will output a pulse on signal line 50 to control 26. This signal from the power loss detector circuit 34 will occur before any significant increase in generator speed occurs. The effect of this rapid fuel flow reduction is to reduce the magnitude of the overspeed but still maintain the power plant in operation to avoid a complete shutdown. This prevents the long shutdown time required before the power plant can be restarted.

Obviously, should this device not be effective, that is, if the fuel reduction does not result in a controlled situation with only modest transient turbine overspeed, the usual safety mechanisms would function such that upon reaching a predetermined magnitude of turbine overspeed, the fuel supply would be shut off completely, resulting in a full power plant shutdown. As stated above, this device is intended as an adjunct to the normal turbine controls, and provides a partial fuel reduction control device that will function prior to the normal functioning of a turbine overspeed control mechanism. It has been found that, in a sudden rapid loss of power, which is not a complete power loss, the sensing mechanism signals only a momentary reduction in fuel supply. This reduction is often adequate to prevent turbine overspeed until the normal controls can function to regain control of the power plant.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A control for a turbine engine including:
   a gas generator comprising a compressor in the turbine and a burner for heating the air from the compressor before it reaches the turbine;
   a free turbine driven by hot gas from the gas generator; and
   a power output device driven by the free turbine, said control including;
   a fuel control valve for the flow of fuel to the burner,
   a control means for moving said valve at least in part as a function of free turbine speed;
   a power sensor for determining the load on the power output device and providing a signal as a function of the load,
   a load loss detector for sensing a power loss in the power output device and providing a signal as a function of the load loss including a time lag device; and
   means for comparing the signals from the power sensor and the detector to determine the rate of power loss and for actuating said control means at or above a predetermined rate loss.

2. A control as in claim 1 including a rate threshold comparator to discriminate between large and small power losses.

3. A control as in claim 1 in which the means for comparing the signal functions to actuate the control means to a partially closed position as a predetermined percent of full power.

4. A control for a turbine engine including:
   a gas generator comprising a compressor and a turbine and a burner for heating the air from the compressor before it reaches the turbine;
   a free turbine driven by the hot gas from a gas generator; and
   a power output device driven by the free turbine;
   said control including,
   a fuel control valve for controlling the flow of fuel to the engine;
   a control means for normally moving said valve at least in part as a function of free turbine speed;
   a power sensor for delivering a signal to said control means as a function of load;
   a load loss detector for determining a sudden loss of load power and for modifying the signal from the power sensor including a comparator to compare the signal from the detector and the signal from the power sensor to provide a signal indicative of the rate of power loss and means for partially closing the control valve in response to the signal indicative of the rate of power loss.

5. A control as in claim 4 including means for comparing a rate threshold circuit with the signal indicative of the rate of power loss to discriminate between large and small power losses and to actuate the control valve only for large power losses.

* * * * *